United States Patent

[11] 3,548,726

[72] Inventors Toshiyuki Mori;
Kazumasa Matsuo, Tokyo, Japan
[21] Appl. No. 724,051
[22] Filed Apr. 25, 1968
[45] Patented Dec. 22, 1970
[73] Assignee Olympus Optical Co. Ltd.
Tokyo, Japan
[32] Priority Aug. 12, 1967
[33] Japan
[31] No. 42/51,558

[54] AUTOMATIC EXPOSURE CONTROL DEVICE OF AN ENDOSCOPIC CAMERA
4 Claims, 9 Drawing Figs.
[52] U.S. Cl. ................................................ 95/10
[51] Int. Cl. ................................................ G03b 7/08
[50] Field of Search ........................................ 95/10, 11; 355/68

[56] References Cited
UNITED STATES PATENTS
3,232,192  2/1966  Stimson ........................ 95/10C

*Primary Examiner*—John M. Horan
*Attorney*—Kurt Kelman

ABSTRACT: Automatic exposure control device of an endoscopic camera wherein the duration of the energization of the lamp for illuminating the object is varied by the timing circuit in the exposure control device in accordance with the intensity of the light received by a photoelectric element provided in the endoscopic camera for obtaining the proper exposure of the film. The photoelectric element is located intermediate the lamp and the objective lens of the endoscopic camera so that the duration of the energization of the lamp controlled by the exposure control device tends to be excessively shortened as the object approaches the objective lens. The resultant underexposure of the film is compensated for by the remaining light emanating from the lamp after deenergization of the lamp effected by the exposure control device when the object is located near the objective lens.

INVENTORS.
TOSHIYUKI MORI
KAZUMASA MATSUO
BY Kurt Kelman
AGENT

INVENTORS.
TOSHIYUKI MORI
KAZUMASA MATSUO
BY Kurt Kelman
AGENT

AUTOMATIC EXPOSURE CONTROL DEVICE OF AN ENDOSCOPIC CAMERA

BACKGROUND OF THE INVENTION

The present invention relates to a novel and useful automatic exposure control device of an endoscopic camera for photographing a portion of the wall of a hollow portion in a living body without viewing the portion at the time of photographing.

The term "endoscopic camera" used herein refers to all kinds of devices for photographing the interior of the living body, such as esophagoscopic, bronchoscopic, gastroscopic, proctosigmoidoscopic, cystoscopic, to thoracescopic, peritoneoscopic, and culdoscopic cameras.

In order to appropriately control the energization of the lamp for the proper exposure of the film in a known endoscopic camera used for the photographing of the hollow portion in a living body, the voltage of the electric power supplied from an electric source to the lamp is adjusted in accordance with the distance between the object and the objective lens which can only be guessed by the operator while the duration of the energization of the lamp is kept constant. However, this procedure is extremely difficult and troublesome, thereby making it impossible to achieve the proper exposure of the film.

Further, when the voltage of the electric power supplied to the lamp is varied, the brightness of the light emanating from the lamp necessarily changes, thereby deteriorating the quality of the image on the film, particularly when a color film is used.

Also, in the prior art endoscopic camera, since the distance between the object and the objective lens can only be guessed by the operator when the endoscopic camera is used, it cannot be avoided to produce waste frames of the color film developed after the exposure thereof which are too white or too red due to the overexposure of the film. The contact of the object with the objective lens causes the light emanating from the lamp to pass through the tissue adjacent to the objective lens and reflect the light toward the objective lens through the tissue thereby resulting in red color of the developed color film. If such a "white frame" or a "red frame" once occurs during the operation of the endoscopic camera, the successive exposures of the film might also produce such "white frames" or "red frame," thereby resulting in a useless film, because there is no means in the prior art endoscopic camera to avoid the above described overexposure.

In photographing the object which is located close to the objective lens by using a lamp which emanates some light after deenergization of the lamp, when the control of the exposure of the film is effected by varying the duration of the energization of the lamp, the ratio of the quantity of this afterglow with respect to that of the light determined by the exposure control device is much greater than the ratio of the quantity of the afterglow light with respect to that of the light determined by the exposure control device when the object is located remote from the objective lens, because the duration of energizing the lamp determined by the exposure control device varies depending upon the distance between the object and the objective lens, thereby varying the quantity of the light in accordance with the distance of the object from the objective lens whereas the quantity of the remaining light after deenergization of the lamp is kept constant regardless of the control of the duration of the energization of the lamp.

This enhances the degree of the overexposure of the film when the object is located adjacent to the objective lens so that the duration of the energization of the lamp is made shorter, thereby increasing the danger of producing useless film during the operation of the endoscopic camera. The present invention aims at avoiding the disadvantages of the prior art endoscopic camera and providing a novel and useful automatic exposure control device for an endoscopic camera.

SUMMARY OF THE INVENTION

The present invention provides a novel and useful automatic exposure control device for use in an endoscopic camera in which a photoelectric element is provided which receives the light from the object illuminated by a lamp provided in the endoscopic camera and supplies signals indicating the intensity of the light received by the photoelectric element to an exposure control circuit for timing the duration of the energization of the lamp, thereby permitting the proper exposure of the film to be achieved regardless of the intensity of the light received by the photoelectric element, that is, the distance between the object and the objective lens.

The present invention also provides a novel and useful automatic exposure control device of the type described above in which a warning lamp or buzzer is provided which is actuated when the intensity of the light incident to the photoelectric element exceeds a predetermined value indicating that the object is located too close to or in contact with the objective lens so that the exposure of the film can be stopped by the operator who is cautioned by the actuation of the warning lamp or a buzzer in order to prevent the so-called "white frame" or "red frame" to be produced.

In the present invention, the photoelectric element is located between the lamp and the objective lens so that the duration of the energization of the lamp is shortened excessively in comparison with the duration of the energization of the lamp to be determined by the distance between the object and the objective lens the nearer the object approaches the objective lens. By such a location of the photoelectric element, the under exposure of the film caused by the excessively shortened duration of the energization of the lamp when the object is close to the objective lens is compensated for by the remaining light emanating from the lamp after the deenergization of the lamp so as to obtain proper exposure of the film.

DETAILED DESCRIPTION OF THE PREFERRED EMBODIMENTS

Prior to the description of the present invention, the construction and the operation of a prior art endoscopic camera will be described below for a better understanding of the present invention.

Figure 1:
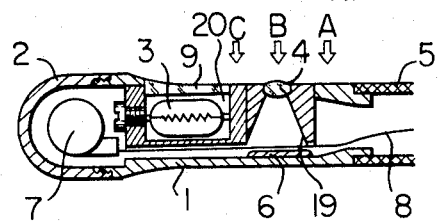
FIG. 1 is a fragmentary longitudinal cross-sectional view showing the camera in an endoscopic camera of the prior art.

FIG. 1 shows an endoscopic camera of the prior art. Cap 2 is releasably secured to one end of camera housing 1 which is in turn connected at its other end to flexible elongated sheath 5. Glass plate 9 and objective lens 4 are provided in the wall of housing 1. A lamp 3 such as a tungsten lamp is located in a chamber 20 provided in housing 1, said glass plate 9 forming the front side of said chamber 20 so that the light emanating from lamp 3 illuminates the object to be photographed by the endoscopic camera. Lamp 3 is energized by an electric source not shown through lead wires connected to lamp 3 and leading to the electric source through flexible sheath 5. A magazine 7 housing therein reeled film 8 is interchangeably located in cap 2 so that film 8 is pulled out of magazine 7 by nonillustrated operating means so as to be passed through exposure window 19 aligned with objective lens 4 thereby permitting the object to be successively photographed on film 8 by the light reflected from the object through objective lens 4 when lamp 3 is energized as film 8 is advanced appropriately.

Figure 7:
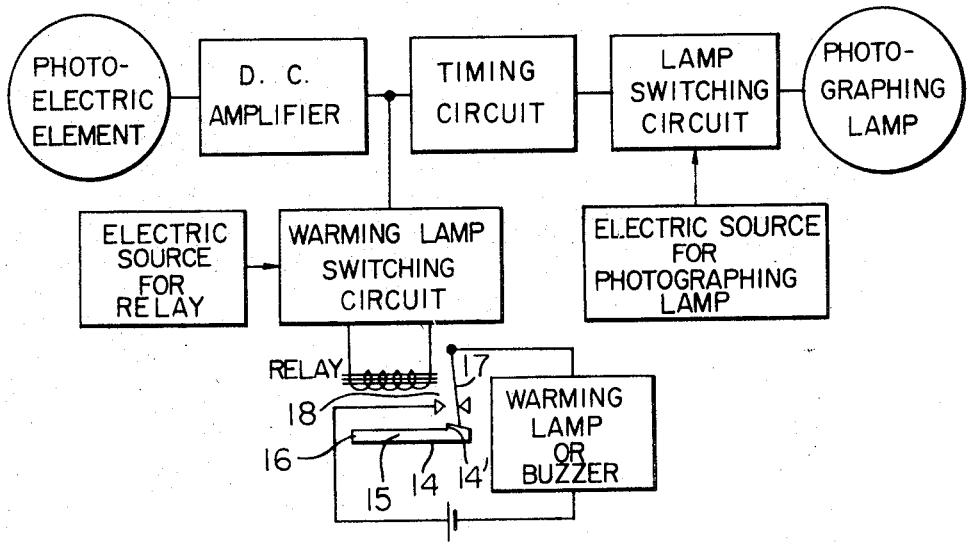
FIG. 7 is a block diagram showing an embodiment of the automatic exposure control circuit in accordance with the present invention for compensating for the overexposure of the film due to the afterglow light of the lamp after deenergization thereof when the object is located close to the objective lens as well as for energizing the warning lamp or buzzer when the object is located too close to or in contact with the objective lens.

In accordance with the present invention, the exposure control of the film is effected by varying the duration of the energization of the lamp in accordance with the intensity of the light incident to the objective lens while the voltage of the electric power supplied to the lamp is kept constant, thereby permitting the correct brightness of the light to be maintained so that high quality of the image on the developed film is obtained. To achieve the above purpose, an exposure control circuit as shown in FIG. 7 is provided in accordance with the present invention. The exposure control circuit shown in FIG. 7 comprises a photoelectric element adapted to receive the light from the object and supply the signals indicating the intensity of the light incident to the objective lens to a DC amplifier connected to the photoelectric element, and a timing circuit connected to the DC amplifier to actuate a lamp switching circuit supplied with electric power from an electric source connected thereto and connected to the timing circuit at a time determined for the proper exposure of the film. The lamp switching circuit deenergizes the lamp connected thereto at the appropriate time determined by the timing circuit. A warning lamp or buzzer switching circuit supplied with electric power from an electric source is connected between said DC amplifier and said timing circuit. The warning lamp or buzzer switching circuit actuates a relay connected thereto in response to the signals supplied from the DC amplifier which is in turn supplied with signals from the photoelectric element. The relay includes swingable member 17 pivoted at its upper end and normally urged in the direction away from the coil of the relay but attracted by the coil of the relay when it is actuated. Swingable lever 14 pivoted about shaft 15 is provided with pawl 14' at its one end. Lever 14 is normally biased in the anticlockwise direction, so that pawl 14' arrests member 17 in its attracted position when the relay is actuated and keeps member 17 in that position even after the relay is deenergized. To facilitate the operation of lever 14, a slanted surface is provided at the outside of pawl 14' so that lever 14 is rotated clockwise when member 17 is attracted by the actuation of the relay by virtue of the sliding engagement of the outer end of member 17 with said slanted surface of lever 14, and again rotated in the anticlockwise direction after member 17 is swung to its leftmost position so that member 17 is arrested by lever 14 with its pawl 14'. Member 17 is connected in a warning lamp or buzzer circuit including a warning lamp or buzzer, an electric source and a contact 18 adapted to contact member 17 when member 17 is attracted by the relay so as to close the warning lamp or buzzer circuit. Therefore, when member 17 is attracted by the relay, the warning lamp or buzzer is actuated. The above described electric sources may have a common electric source.

In operation, the lamp is energized by operating the exposure control circuit so as to supply electric power from the electric source to the lamp through the lamp switching circuit. The light emanating from the lamp reaches the object and is reflected therefrom toward the objective lens and the photoelectric element. The photoelectric element produces signals corresponding to the intensity of the light incident thereto. The signals thus produced are supplied to the DC amplifier, thereby permitting the lamp to be deenergized for the proper exposure of the film by the cooperation of the timing circuit and the lamp switching circuit. The signals produced by the DC amplifier are also supplied to the warning lamp switching circuit, thereby permitting the warning lamp or buzzer to be actuated by the cooperation of the relay and the warning lamp or buzzer circuit when the intensity of the light exceeds a predetermined value set in the exposure control circuit for indicating that the object is located too close to or in contact with the objective lens.

To open the warning lamp or buzzer circuit it is only necessary to push outer end 16 of lever 14 so as to rotate lever 14 clockwise, thereby releasing member 17 from pawl 14' of lever 14 so that contact 18 is disengaged from member 17.

The photoelectric element must be in an appropriate position in the endoscopic camera so as to actuate the exposure control circuit to determine the duration of the energization of the lamp for the proper exposure of the film.

Figure 2:
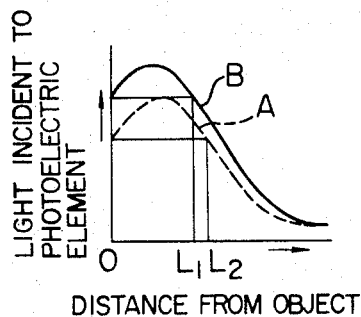
FIG. 2 is a diagram showing the relation between the light quantity incident to the photoelectric element provided at positions indicated by A and B in FIG. 1 and the distance between the object and the objective lens of the endoscopic camera.

FIG. 2 shows the relation between the light incident to the photoelectric element and the distance between the object and the objective lens, curve B showing the light incident to the objective lens while curve A shows the light incident to the photoelectric element when it is located at a position indicated by A in FIG. 1. As is clear from FIG. 2, the intensity of the light incident to each of the objective lens and the photoelectric element increases to the maximum as the object approaches the objective lens to a certain point at a distance therefrom but the intensity of the light decreases as the object further moves nearer toward the objective lens beyond said certain point.

Therefore, the location of the photoelectric element at position A in FIG. 1 is inappropriate, because there is a danger of actuating the warning lamp or buzzer in the entire range $OL_2$ in FIG. 2 when the exposure control circuit is set to actuate the warning lamp or buzzer so as to avoid the "red frame" which occurs when the object contacts with the objective lens. Therefore, the proper exposure of the film in a part of the range $OL_1$ in FIG. 2 might also be excluded by the actuation of the warning lamp or buzzer.

Figure 3:
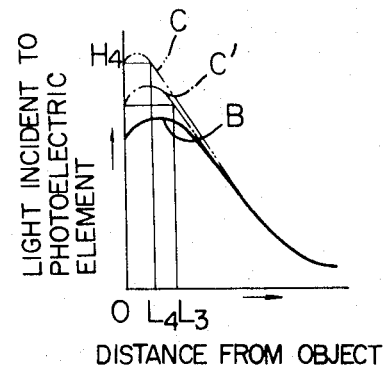
FIG. 3 is a diagram similar to FIG. 2 but showing the relation between the light quantity and the distance when the photoelectric element is located at positions indicated by B and C in FIG. 1.

Similarly, when the photoelectric element is located at a position indicated by B in FIG. 1, more particularly, when the photoelectric element is located at a position adjacent to the objective lens in which a portion of the light passing through the objective lens is reflected by a mirror or a semitransparent mirror located behind the objective lens toward the photoelectric element, the light incident to the photoelectric element precisely corresponds to that incident to the objective lens as shown by curve B in FIGS. 2 and 3. Therefore, the location of the photoelectric element at position B in FIG. 1 is inappropriate for substantially the same reason as that in which the photoelectric element is located at position A in FIG. 1.

In accordance with one feature of the present invention, the photoelectric element is located at a position indicated by C in FIG. 1.

Figure 6:
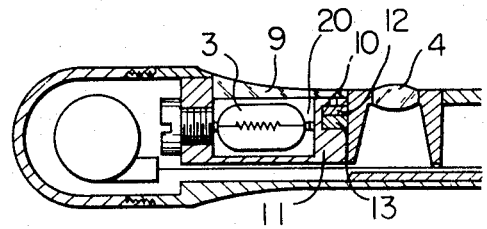
FIG. 6 is a fragmentary longitudinal cross-sectional view showing an embodiment of the endoscopic camera of the present invention in which the photoelectric element is located between the lamp and the objective lens in accordance with the present invention.

FIG. 6 shows an embodiment of the preferred arrangement of the photoelectric element in accordance with the present invention. The arrangement of the main part of the camera shown in FIG. 6 is similar to that shown in FIG. 1 except that photoelectric element 12 embedded in a mold 13 is located in a recess in wall 13 of chamber 20. Small hole 10 is provided in the front side of the recess in wall 13 so that the light incident to hole 10 can be received by photoelectric element 12. The size of hole 10 determines the reception angle of the light incident to the photoelectric element. As shown, glass plate 9 extends over hole 10 so as to cover hole 10. By the arrangement of photoelectric element 23 12 as shown in FIG. 6, the relation between the light incident to photoelectric element 12 and the distance between the object and the objective lens is such that curve B showing the light incident to the objective lens and curve C showing the light incident to photoelectric element 12 have the configuration shown in FIG. 3. Curve C' shows the light incident to photoelectric element 12 when glass plate 9 does not extend over hole 10 so that a portion of the light transmitted through glass plate 9 is prevented from directly entering hole 10. By the provision of glass plate 9 extending over hole 10, as shown in FIG. 6, the amount of light incident to photoelectric element 12 is increased, as shown by curve C, by virtue of the fact that a portion of the light emanating from lamp 3 is admitted to photoelectric element 12 directly through glass plate 9 and hole 10 even if the object contacts the objective lens. As is clear from FIG. 3, when the exposure control circuit is set so as to prevent a "red frame," that is, the exposure control circuit is actuated when the intensity of the light incident to photoelectric element 12 reaches $H_4$ in FIG. 3, proper exposure of the film in the entire range of the distance between the object and the objective lens, excepting small range $OL_4$ is assured. The actual light quantity incident to the objective lens, as shown by curve B, becomes smaller in relation to that incident to photoelectric element 12, as shown by curves C, C', as the object approaches the objective lens, thereby deteriorating the proper exposure of the film. However, by the provision of photoelectric element 12 at the position shown in FIG. 6 in accordance with the present invention, the above disadvantage can be advantageously avoided. As previously described, the ratio of the quantity of the light emanating from the lamp after deenergization thereof with respect to the quantity of the entire light required for the proper exposure of the film as determined by the timing circuit of the exposure control circuit becomes significantly greater as the distance between the object and the objective lens and hence the duration of energization of the lamp decreases.

Figure 4:
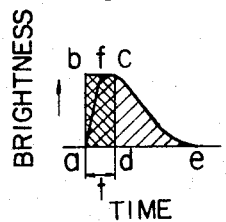
FIG. 4 is a diagram showing the relation between the brightness of the lamp and the time when the object is located near the objective lens, the time of energization of the lamp being controlled by the control circuit of the present invention.
Figure 5:
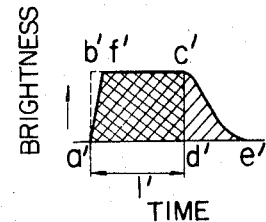
FIG. 5 is a view similar to FIG. 4 but showing the relation between the brightness and the time when the object is located remote from the objective lens.

FIGS. 4 and 5 show the above relationship. As shown, area $c\ d\ e$ in FIG. 4 shows the afterglow light and area $a\ b\ c\ d$ shows the light required for the proper exposure of the film as determined by the exposure control circuit, when time $t$, i.e. the distance, is small. Similarly, area $c'\ d'\ e'$ and area $a'\ b'\ c'\ d'$ in FIG. 5 show the afterglow light and the light required for the proper exposure of the film, respectively, when time $t$, i.e. the distance, is large.

Actual total light quantity emanating from the lamp is indicated by $a\ a\ f\ c\ e$ and $a'\ f'\ c'\ e'$ in FIGS. 4 and 5, respectively. Since the ratio of the light quantity indicated by area $c\ d\ e$ with respect to that indicated by area $a\ b\ c\ d$ is greater than the ratio of the light quantity indicated by area $c'\ d'\ e'$ with respect to that indicated by area $a'\ b'\ c'\ d'$, it is evident that $$\frac{\text{area } afce}{\text{area } abcd} > \frac{\text{area } f'f'c'e'}{\text{area } a'b'c'd'}$$

This relation can positively compensate for the underexposure of the film described above by the location of the photoelectric element shown in FIG. 6 in accordance with the present invention as the object approaches the objective lens. This is the characteristic feature of the present invention.

The location of the photoelectric element in accordance with the present invention further avoids the disadvantage in giving the patient a pain due to the heat transmitted from the lamp to the wall of the hollow body portion of the patient into which the endoscopic camera is inserted, as is the case when the photoelectric element is located in positions shown by A and B in FIG. 1, because the duration of the energization of the lamp is increased in the latter case even if the wall of the hollow portion contacts the camera due to the smaller quantity of the light incident to the photoelectric element in comparison with that when the photoelectric element is located between the lamp and the objective lens.

Figure 8:
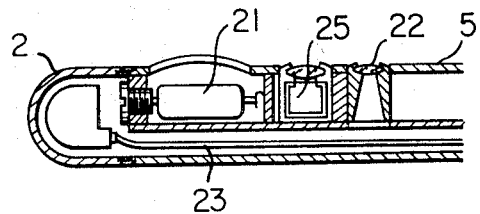
FIG. 8 is a fragmentary longitudinal cross-sectional view showing a second embodiment of the endoscopic camera of the present invention.

FIG. 8 shows another embodiment of the present invention. The endoscopic camera shown in FIG. 8 is similar to that shown in FIG. 6. Lamp 21 is energized to illuminate the object to be photographed. The light reflected from the object is incident to objective lens 22 and focuses the image of the object on film 23. Photoelectric element 25 provided with a lens in front thereof is located between lamp 21 and objective lens 22. The light received by photoelectric element 25 produces signals for automatically determining the duration of the energization of the lamp for the proper exposure of the film by means of the automatic exposure control circuit as described below.

Figure 9:
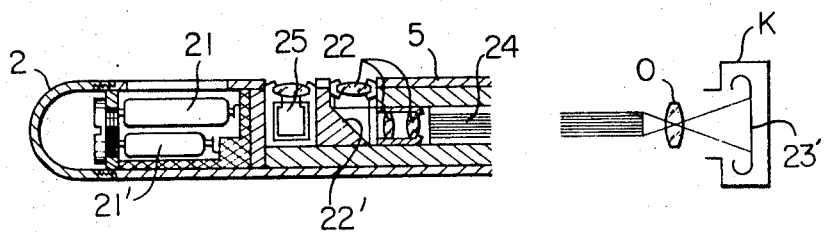
FIG. 9 is a view similar to FIG. 8 but showing another embodiment of the present invention in which a fiber optical system is employed in place of the camera as shown in FIGS. 6 and 8 so as to transmit the image toward the film located at the rear end of the endoscopic camera.

FIG. 9 shows a modification of the present invention. Image transmitting fiber optical system 24 extends through elongated flexible sheath 5 from the position adjacent to objective lens 22 to a control housing not shown to which the rear end of sheath 5 is connected. Objective lens 22 comprises reflecting mirror or prism 22'. The image of the object is focused on the forward end surface of fiber optical system 24 by the objective lens. The image focused on the forward end surface of fiber optical system 24 is transmitted therethrough to the rear end surface of fiber optical system 24. A camera K or viewing means not shown is detachably connected to said control housing. When camera K is connected to the control housing, the image on the rear end surface of fiber optical system 24 is focused on film 23' in camera K by means of an objective lens 0. Lamp 21' is used when the viewing means is connected to the control housing so that the image on the rear end surface of fiber optical system 24 is viewed directly.

We claim:

1. Automatic exposure control device of an endoscopic camera having a lamp emanating some light after deenergization thereof in which the duration of the energization of the lamp is controlled by a photoelectric element connected to said exposure control device for the proper exposure of the film while the voltage of the power supplied to the lamp is kept constant during the energization thereof, wherein the improvement comprises the fact that the photoelectric element is located intermediate the objective lens of the camera and the lamp so that the duration of the energization of the lamp controlled by the exposure control device is made excessively shorter as the object approaches the objective lens by virtue of the excessive increase in the light incident to the photoelectric element in comparison with that incident to the objective lens resulting from the location of the photoelectric element intermediate the objective lens and the lamp in order to compensate for the overexposure of the film resulting from the remaining light emanating from the lamp after deenergization thereof as controlled by the exposure control device when the object is near the objective lens so as to obtain proper exposure of the film.

2. Device according to claim 1 wherein a glass plate provided in front of the lamp for passing the light from the lamp therethrough extends over the photoelectric element to cover same thereby permitting a portion of the light from the lamp to be admitted to the photoelectric element directly through said glass plate even when the object contacts with the objective lens.

3. Device according to claim 1 wherein a warning means such as a lamp or a buzzer is provided which is actuated when the light incident to the photoelectric element exceeds a predetermined value set for the proper exposure of the film as the object approaches the objective lens so that the operator is warned thereby to avoid the exposure of the film when the object is located too near the objective lens or is contacted with the objective lens.

4. Device according to claim 2 wherein a warning means is provided which is actuated when the light incident to the photoelectric element exceeds a predetermined value for the proper exposure of the film as the object approaches the objective lens so that the operator is warned thereby to avoid the exposure of the film when the object is located too near the objective lens or is contacted with the objective lens.